United States Patent
Au et al.

(10) Patent No.: US 7,092,717 B2
(45) Date of Patent: Aug. 15, 2006

(54) METHOD AND SYSTEM FOR A DYNAMIC ADJUSTMENT OF A DATA REQUEST CHANNEL IN A COMMUNICATION SYSTEM

(75) Inventors: Jean Put Ling Au, San Diego, CA (US); Rashid Ahmed Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 10/326,243

(22) Filed: Dec. 20, 2002

(65) Prior Publication Data

US 2004/0203809 A1    Oct. 14, 2004

(51) Int. Cl.
*H04Q 7/20* (2006.01)

(52) U.S. Cl. ............... 455/452.1; 455/509; 455/452.2; 370/252; 370/332

(58) Field of Classification Search ................ 455/403, 455/450, 452.1, 517, 63.1, 67.11; 370/252–255, 370/320, 329, 330–333, 468; 714/704, 776, 714/799
See application file for complete search history.

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,504,773 A | | 4/1996 | Padovani et al. |
| 5,745,520 A | * | 4/1998 | Love et al. ................. 375/130 |
| 5,940,430 A | | 8/1999 | Love et al. |
| 5,999,522 A | * | 12/1999 | Rohani ........................ 370/331 |
| 6,198,937 B1 | * | 3/2001 | DeClerck et al. ........... 455/517 |
| 6,205,129 B1 | | 3/2001 | Esteves et al. |
| 6,285,668 B1 | | 9/2001 | Kang |
| 6,442,157 B1 | * | 8/2002 | Carter et al. ................. 370/347 |
| 6,574,211 B1 | | 6/2003 | Padovani et al. |
| 6,718,171 B1 | * | 4/2004 | Hunzinger ................... 455/450 |
| 6,735,178 B1 | * | 5/2004 | Srivastava et al. ........... 370/252 |
| 6,757,520 B1 | * | 6/2004 | Attar et al. ................. 455/63.1 |
| 6,804,532 B1 | * | 10/2004 | Moon et al. .............. 455/552.1 |
| 6,868,277 B1 | * | 3/2005 | Cerwall et al. ............. 455/509 |
| 2002/0111158 A1 | | 8/2002 | Tee |
| 2003/0017842 A1 | * | 1/2003 | Moles et al. ................. 455/552 |
| 2003/0050084 A1 | | 3/2003 | Damnjanovic et al. |
| 2003/0083090 A1 | | 5/2003 | Huh et al. |

OTHER PUBLICATIONS

Andrew Viterbi et al., "Soft Handoff Extends CDMA Cell Coverage and Increases Reverse Link Capacity," IEEE Journal On Selected Araes In Communications, vol. 12, No. 8, Oct. 1994, pp. 1281-1288.

* cited by examiner

*Primary Examiner*—Charles N. Appiah
(74) *Attorney, Agent, or Firm*—Philip Wadsworth; Sandra L. Godsey; Pavel Kalousek

(57) ABSTRACT

Method and a system method and system for a dynamic adjustment of a data request channel in a communication system are disclosed. A value of at least one variable affecting the data request channel margin is determined in accordance with conditions in the communication system. The at least one variable is then set to the determined value. The value of the at least one variable is then conveyed to a subscriber station in an adjustment message. The subscriber station determines whether the adjustment message was transmitted by a serving sector or a non-serving sector; and adjusts at least one attribute of the communication channel in accordance with the determination, thus adjusting the DRC channel margin.

22 Claims, 6 Drawing Sheets

METHOD AND SYSTEM FOR A DYNAMIC ADJUSTMENT OF A DATA REQUEST CHANNEL IN A COMMUNICATION SYSTEM

BACKGROUND

1. Field

The present invention relates to communications in a wireline or a wireless communication system. More particularly, the present invention relates to a method and system for a dynamic adjustment of a data request channel in such a communication system.

2. Background

Communication systems have been developed to allow transmission of information signals from an origination station to a physically distinct destination station. In transmitting an information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier wave is confined within the communication channel bandwidth. At the destination station, the original information signal is reconstructed from the modulated carrier wave received over the communication channel. In general, such a reconstruction is achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent access of relatively short duration rather than continuous access to the common communication channel. Several multiple-access techniques are known in the art, such as time division multiple-access (TDMA), and frequency division multiple-access (FDMA). Another type of a multiple-access technique is a code-division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the present assignee.

A multiple-access communication system may be wireless or wireline and may carry voice traffic and/or data traffic. An example of a communication system carrying both voice and data traffic is a system in accordance with the IS-95 standard, which specifies transmitting voice and data traffic over a communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION," assigned to the present assignee. In accordance with the IS-95 standard, the data traffic or voice traffic is partitioned into code channel frames that are 20 milliseconds wide with data rates as high as 14.4 Kbps. Additional examples of communication systems carrying both voice and data traffic comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

The term base station is an access network entity, with which subscriber stations communicate. With reference to the IS-856 standard, the base station is also referred to as an access point. Cell refers to the base station or a geographic coverage area served by a base station, depending on the context in which the term is used. A sector is a partition of a base station, serving a partition of a geographic area served by the base station.

The term "subscriber station" is the entity with which an access network communicates. With reference to the IS-856 standard, the base station is also referred to as an access terminal. A subscriber station may be mobile or stationary. A subscriber station may be any data device that communicates through a wireless channel or through a wired channel, for example fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state. A subscriber station that has established an active traffic channel connection with a base station is called an active subscriber station, and is said to be in a traffic state.

The term access network is a collection of at least one base station (BS) and one or more base stations' controllers. The access network transports information signals between multiple subscriber stations. The access network may be further connected to additional networks outside the access network, such as a corporate intranet or the Internet, and may transport information signals between each base station and such outside networks.

In the above-described multiple-access wireless communication system, communications between users are conducted through one or more base stations. The term user refers to both animate and inanimate entities. A first user on one wireless subscriber station communicates to a second user on a second wireless subscriber station by conveying information signal on a reverse link to a base station. The base station receives the information signal and conveys the information signal on a forward link to the second subscriber station. If the second subscriber station is not in the area served by the base station, the base station routes the data to another base station, in whose service area the second subscriber station is located. The second base station then conveys the information signal on a forward link to the second subscriber station. The forward link refers to transmissions from a base station to a wireless subscriber station and the reverse link refers to transmissions from a wireless subscriber station to a base station. Likewise, the communication can be conducted between a first user on a wireless subscriber station and a second user on a landline station. A base station receives the data from the first user on the wireless subscriber station on a reverse link, and routes the data through a public switched telephone network (PSTN) to the second user on a landline station. In many communication systems, e.g., IS-95, W-CDMA, and IS-2000, the forward link and the reverse link are allocated separate frequencies.

Study of voice traffic only services and data traffic only services revealed some substantial differences between the two types of services, e.g., requirements on delay in delivery of the information content, grade of service (GOS), a reliability of a communication link, and other known differences.

The above-mentioned differences lead to a development of a data traffic only communication system, e.g., a communication system known as the High Data Rate (HDR) communication system. Such a communication system is disclosed in detail in co-pending application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun. 3, 2003, assigned to the present assignee. The HDR communication system was standardized as a TIA/EIA/IS-856 industry standard hereinafter referred to as the IS-856 standard.

The IS-856 standard defines a set of data rates, ranging from 38.4 kbps to 2.4 Mbps, at which an access point (AP) may send data to a subscriber station (access terminal). Because the access point is analogous to a base station, the terminology with respect to cells and sectors is the same as with respect to voice systems. In accordance with the IS-856 standard, the data to be transmitted over the forward link are partitioned into data packets, with each data packet being transmitted over one or more intervals (time-slots), into which the forward link is divided. The term packet is a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and other quality metrics known to one skilled in the art. At each time-slot, data transmission occurs from an access point to one and only one access terminal, located within the coverage area of the access point, at the maximum data rate that can be supported by the forward link and the communication system. The access terminal is selected in accordance with forward link conditions between the access point and an access terminal. The forward link conditions depend on interference and path loss between an access point and an access terminal, both of which are time-variant. The path loss and the variation of the path loss are exploited by scheduling the access point's transmissions at time intervals, during which the access terminal's forward link conditions to a particular access point satisfy determined criteria that allow for transmissions with less power or higher rate of data than transmissions to the remaining access terminals, thus improving spectral efficiency of forward link transmissions. Even if a transmission from an access point to an access terminal fails, because of relaxed transmission delay requirement, as compared to a voice services, the transmit power and resources used to support soft handoff on the forward link can be used for transmission of additional data, thus, increasing average throughput rate by increasing efficiency.

In contrast, according to the IS-856 standard, data transmissions on the reverse link occur from multiple access terminals located within a coverage area of an access point. Furthermore, because the access terminals' antenna patterns are omni-directional, any access terminal within the coverage area of the access point may receive these data transmissions. Consequently, the reverse link transmissions are subjected to several sources of interference: code-division multiplexed overhead channels of other access terminals, data transmissions from access terminals located in the coverage area of the access point (same-cell access terminals), and data transmissions from access terminals located in the coverage area of other access points (other-cell access terminals). Because re-transmission of packets from a subscriber station requires additional power from a power limited source (a battery), it may be efficient to support soft handoff on the reverse link by allocating resources at several base stations to receive and process the data packets transmitted from the subscriber station. Such a utilization of soft handoff increases both coverage and reverse link capacity as discussed in a paper by Andrew J. Viterbi and Klein S. Gilhousen: "Soft Handoff Increases CDMA coverage and Increases Reverse Link Capacity," IEEE Journal on Selected Areas in Communications, Vol. 12, No. 8, October 1994. The term soft handoff is a communication between a subscriber station and two or more sectors, wherein each sector belongs to a different cell. In the context of the IS-856 standard, data transmission on the forward link is non-simultaneously carried out between one of the two or more sectors and the access terminal.

Additionally, a softer handoff may be used for this purpose. The term softer handoff is a communication between a subscriber station and two or more sectors, wherein each sector belongs to the same cell. In the context of the IS-856 standard, data transmission on the forward link is non-simultaneously carried out between one of the two or more sectors and the access terminal.

In a communication system in accordance with the IS-856 standard, an Access Terminal indicates an estimate of the highest data rate on a forward link between an Access Point and the Access Terminal to the Access Network via a data request (DRC) channel transmitted over a reverse link. An access point that is selected for data communication the access terminal or an access point that is communicating data to the particular access terminal is serving access point. To maximize forward link utilization, an access terminal attempts to select an access point having a best quality metric of the forward link as determined at the access terminal. The DRC channel has a margin, designed to assure correct reception of the DRC channel for varying conditions on the reverse link. However, the margin cannot be infinite, consequently, if the reverse link conditions worsen beyond the condition under which the DRC channel can be sustained given the margin, correct reception of the DRC channel cannot be assured. Consequently, the access terminal may select an access point with lower quality metric forward link—an event referred to as imbalance. Even in situations unaffected by imbalance, a high erasure rate of the DRC channel may result in underutilization of the forward link. The term erasure is a failure to recognize a message.

Therefore, there is a need in the art to provide a method and an apparatus to minimize the occurrence of imbalance and underutilization of forward link.

The above and further features of the invention are set forth with particularity in the appended claims and together with advantages thereof will become clearer form considerations of the following detailed description of embodiments of the invention given by way of example with reference to the accompanying drawings.

SUMMARY

In one aspect the above stated needs are addressed by determining values of variables for dynamic adjustment of a communication channel by determining whether an active set size changed; and determining a value of at least one variable in accordance with the determination whether the active set size changed.

In another aspect the above stated needs are addressed by determining values of variables for dynamic adjustment of a communication channel by determining a first metric of a first link; determining a second metric of a second link; and determining a value of at least one variable in accordance with the first metric and the second metric.

In another aspect the above stated needs are addressed by dynamically adjusting a communication channel, the method comprising: receiving an adjustment message; determining whether the adjustment message was transmitted by a serving sector or a non-serving sector; and adjusting at least one attribute of the communication channel in accordance with the determining.

DETAILED DESCRIPTION

Detailed Description

Figure 1:
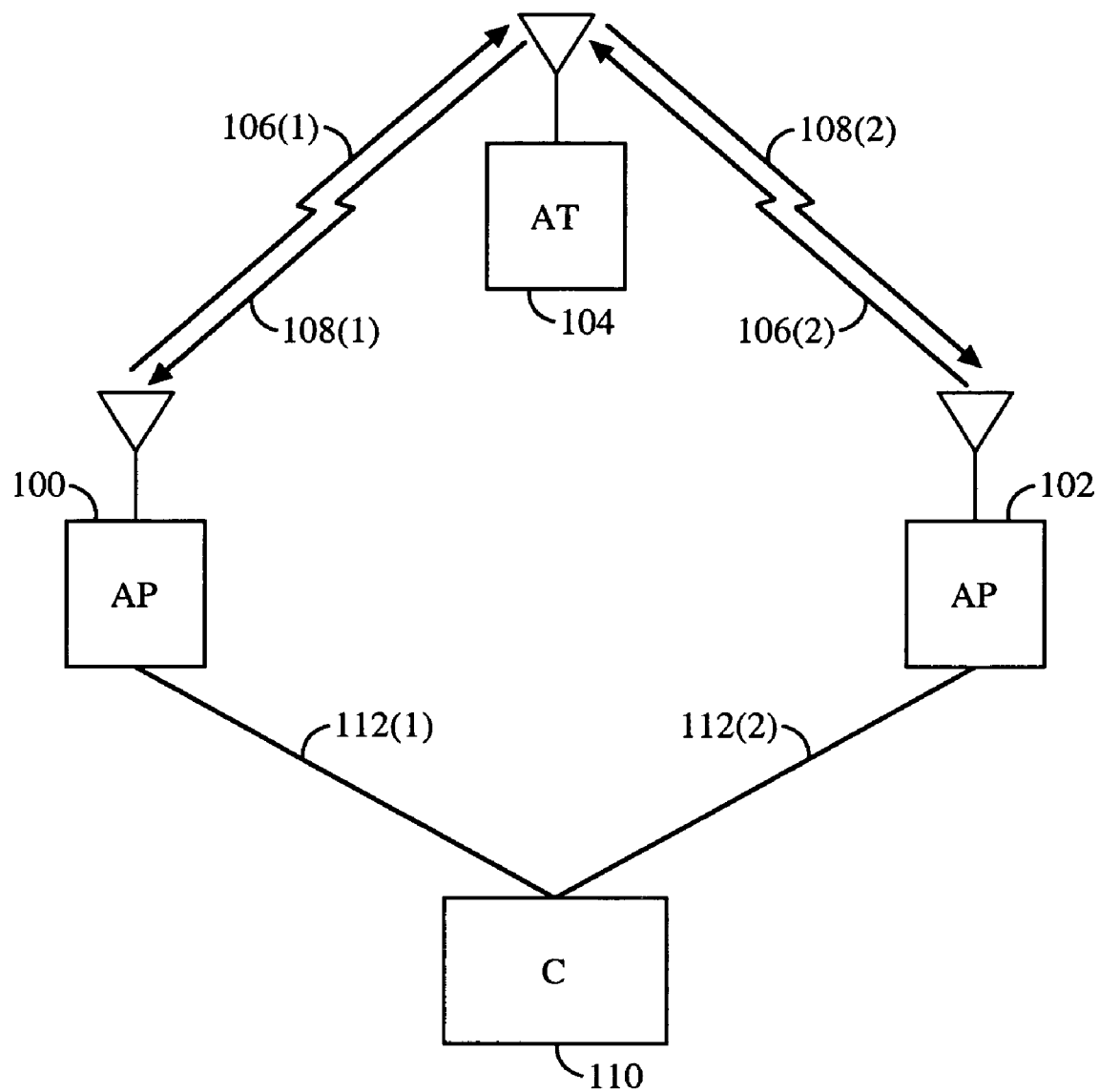
FIG. 1 illustrates conceptual block diagram of a communication system capable of providing dynamic adjustment of a data request channel.

FIG. 1 illustrates a conceptual diagram of a communication system. Such a communication system can be built in accordance with the IS-856 standard. An access point 100 transmits data to an access terminal 104 over a forward link 106(1), and receives data from the access terminal 104 over a reverse link 108(1). Similarly, an access point 102 transmits data to the access terminal 104 over a forward link 106(2), and receives data from the access terminal 104 over a reverse link 108(2). Data transmission on the forward link occurs from one access point to one access terminal at or near the maximum data rate that can be supported by the forward link and the communication system. Additional channels of the forward link, e.g., control channel, may be transmitted from multiple access points to one access terminal. Reverse link data communication may occur from one access terminal to one or more access points. The access point 100 and the access point 102 are connected to a controller 110 over backhauls 112(1) and 112(2). A "backhaul" is a communication link between a controller and an access point. Although only two access terminals and one access point are shown in FIG. 1, this is for the sake of explanation only, and the communication system can comprise a plurality of access terminals and access points.

After registration, which allows an access terminal to access an access network, the access terminal 104 and one of the access points, e.g., the access point 100, establish a communication link using a predetermined access procedure. In the connected state, resulting from the predetermined access procedure, the access terminal 104 is able to receive data and control messages from the access point 100, and is able to transmit data and control messages to the access point 100. The access terminal 104 continually searches for other access points that could be added to the access terminal's 104 active set. An active set comprises a list of access points capable of communication with the access terminal 104. When such an access point is found, the access terminal 104 calculates a quality metric of the access point's forward link, which may comprise a signal-to-interference-and-noise ratio (SINR). An SINR may be determined in accordance with a pilot signal. The access terminal 104 searches for other access points and determines access points' SINR. Simultaneously, the access terminal 104 calculates a quality metric of a forward link for each access point in the access terminal's 104 active set. If the forward link quality metric from a particular access point is above a predetermined add threshold or below a predetermined drop threshold for a predetermined period of time, the access terminal 104 reports this information to the access point 100. Subsequent messages from the access point 100 may direct the access terminal 104 to add to or to delete from the access terminal 104 active set the particular access point.

The access terminal 104 selects a serving access point from the access terminal's 104 active set based on a set of parameters. A serving access point is an access point that is selected for data communication a particular access terminal or an access point that is communicating data to the particular access terminal. The set of parameters may comprise any one or more of present and previous SINR measurements, a bit-error-rate, a packet-error-rate, for example, and any other known parameters. Thus, for example, the serving access point may be selected in accordance with the largest SINR measurement. The access terminal 104 then broadcasts a data request message (DRC message) on a data request channel (DRC channel). The DRC message can contain a requested data rate or, alternatively, an indication of a quality of the forward link, e.g., measured SINR, a bit-error-rate, a packet-error-rate and the like. The access terminal 104 may direct the broadcast of the DRC message to a specific access point by the use of a code, which uniquely identifies the specific access point. Typically, the code comprises a Walsh code. The DRC message symbols are exclusively OR'ed (XOR) with the unique Walsh code. This XOR operation is referred to as Walsh covering of a signal. Since each access point in the active set of the access terminal 104 is identified by a unique Walsh code, only the selected access point which performs the identical XOR operation as that performed by the access terminal 104 with the correct Walsh code can correctly decode the DRC message.

The data to be transmitted to the access terminal 104 arrive at the controller 110. Thereafter, the controller 110 may send the data to all access points in the access terminal 104 active set over the backhaul 112. Alternatively, the controller 110 may first determine, which access point was selected by the access terminal 104 as the serving access point, and then send the data to the serving access point. The data are stored in a queue at the access point(s). A paging message is then sent by one or more access points to the access terminal 104 on respective control channels. The access terminal 104 demodulates and decodes the signals on one or more control channels to obtain the paging messages.

At each forward link interval, the access point may schedule data transmissions to any of the access terminals that received the paging message. An exemplary method for scheduling transmission is described in U.S. Pat. No. 6,229,795, entitled "System for allocating resources in a communication system," assigned to the present assignee. The access point uses the rate control information received in the DRC message from each access terminal to efficiently transmit forward link data at the highest possible rate. Because the rate of data may vary, the communication system operates in a variable rate mode. The access point determines the data rate at which to transmit the data to the access terminal 104 based on the most recent value of the DRC message received from the access terminal 104. Additionally, the access point uniquely identifies a transmission to the access terminal 104 by using a spreading code which is unique to that mobile station. This spreading code is a long pseudo noise (PN) code, for example a spreading code defined by the IS-856 standard.

The access terminal 104, for which the data packet is intended, receives and decodes the data packet. Each data packet is associated with an identifier, e.g., a sequence number, which is used by the access terminal 104 to detect either missed or duplicate transmissions. In such an event, the access terminal 104 communicates the sequence numbers of the missing data packets via the reverse link data channel. The controller 110, which receives the data messages from the access terminal 104 via the access point communicating with the access terminal 104, then indicates to the access point what data units were not received by the access terminal 104. The access point then schedules a re-transmission of such data packets.

When the communication link between the access terminal 104 and the access point 100, operating in the variable rate mode, deteriorates below a predetermined reliability level, the access terminal 104 first attempts to determine whether another access point in the variable rate mode can support an acceptable rate of data. If the access terminal 104 ascertains such an access point (e.g., the access point 102), a re-pointing to the access point 102 to a different communication link occurs. The term re-pointing is a selection of a sector that is a member of an access terminals' active list, wherein the sector is different than a currently selected sector. The data transmissions continue from the access point 102 in the variable rate mode.

The above-mentioned deterioration of the communication link can be caused by, e.g., the access terminal 104 moving from a coverage area of the access point 100 to the coverage area of the access point 102, shadowing, fading, and other well known reasons. Alternatively, when a communication link between the access terminal 104 and another access point (e.g., the access point 102) that may achieve a higher throughput rate than the currently used communication link becomes available, a re-pointing to the access point 102 to a different communication link occurs, and the data transmissions continue from the access point 102 in the variable rate mode. If the access terminal 104 fails to detect an access point that can operate in the variable rate mode and support an acceptable data rate, the access terminal 104 transitions into a fixed rate mode. In such a mode, access terminal transmits at one rate. The term fixed rate mode is used exclusively herein to mean that a particular sector transmits a Forward Traffic Channel to the AT at one particular rate.

The access terminal 104 evaluates the communication links with all candidate access points for both variable rate data and fixed rate data modes, and selects the access point, which yields the highest throughput.

The access terminal 104 will switch from the fixed rate mode back to the variable rate mode if the sector is no longer a member of the access terminal 104 active set.

The above-described fixed rate mode and associated methods for transition to and from the fixed rate data mode are similar to those disclosed in detail in U.S. Pat. No. 6,205,129, entitled "METHOD AND APPARATUS FOR VARIABLE AND FIXED FORWARD LINK RATE CONTROL IN A MOBILE RADIO COMMUNICATION SYSTEM", assigned to the present assignee. Other fixed rate modes and associated methods for transition to and from the fixed mode can also be contemplated and are within the scope of the present invention.

One skilled in the art recognizes that an AP can comprise one or more sectors. In the description above, the term AP was used generically to allow clear explanation of basic concepts of the HDR communication system. However, one skilled in the art can extend the explained concepts to AP comprising any number of sectors. Consequently, the concept of sector will be used throughout the rest of the document.

Forward Link Structure

Figure 2:
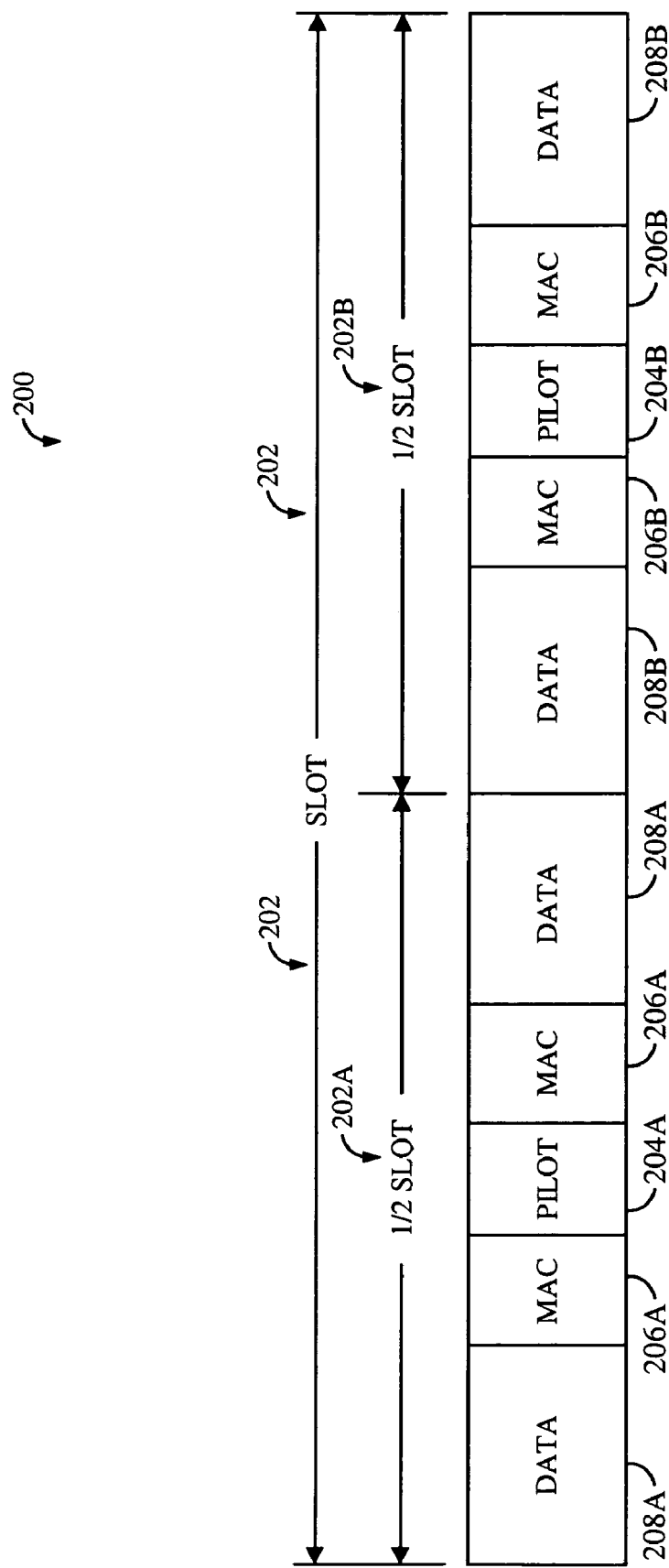
FIG. 2 illustrates a forward link.

FIG. 2 illustrates a forward link structure 200. It will be appreciated that the below described time durations, chip lengths, value ranges are given in a way of example only, and other time durations, chip lengths, value ranges may be used without departing from the underlying principles of operation of the communication system. The term "chip" is a unit of a Walsh code spreading signal having two possible values.

The forward link 200 is defined in terms of frames. A frame is a structure comprising 16 time-slots 202, each time-slot 202 being 2048 chips long, corresponding to a 1.66 ms time-slot duration, and, consequently, a 26.66 ms frame duration. Each time-slot 202 is divided into two half-time-slots 202A, 202B, with pilot bursts 204A, 204B transmitted within each half-time-slot 202A, 202B. Each pilot burst 204A, 204B is 96 chips long, centered about a mid-point of its associated half-time-slot 202A, 202B. The pilot bursts 204A, 204B comprise a pilot channel signal covered by a Walsh cover with index 0. A forward medium access control channel (MAC) 206 forms two bursts, which are transmitted immediately before and immediately after the pilot burst 204 of each half-time-slot 202. The MAC is composed of up to 64 code channels, which are orthogonally covered by 64-ary Walsh codes. Each code channel is identified by a MAC index, which has a value between 1 and 64, and identifies a unique 64-ary covering Walsh code. A reverse power control channel (RPC) is used to regulate the power of the reverse link signals for each subscriber station. The RPC is assigned to one of the available MACs with MAC index between 5 and 63. The forward link traffic channel or the control channel payload is sent in the remaining portions 208A of the first half-time-slot 202A and the remaining portions 208B of the second half-time-slot 202B. The traffic channel carries user data, while the control channel carries control messages, and may also carry user data. The control channel is transmitted with a cycle defined as a 256 slot period at a data rate of 76.8 kbps or 38.4 kbps. The term user data, also referred to as traffic, is information other than overhead data. The term overhead data is information enabling operation of entities in a communication system, e.g., call maintenance signaling, diagnostic and reporting information, and the like.

Imbalance In Communication System

In a wireless communications system, e.g., a wireless communications system in accordance with FIG. 1, an imbalance may occur between a forward link and a reverse link. Imbalance occurs when a first sector's forward link quality metric is greater than a second sector's forward link quality metric as measured at an AT, and the AT's reverse link quality metric as measured at the first sector is less than a reverse link quality metric as measured at the second sector. It has been observed that low levels of imbalance, e.g., less than 1 dB are almost always present in a communication system. This level of imbalance appears to have little impact either on the forward link requested/served rate or on the DRC erasure rate on the reverse link. As used herein the term DRC erasure rate indicates a percentage of DRC messages that were erased at the AP. Consequently, such an imbalance is accepted because the cost, e.g., outage associated with re-pointing DRC from one sector to another sector in a dynamic communication system environment (changing channel conditions, AT mobility), far exceeds the small penalty in forward link sector throughput that may result. The term outage is a time interval during which the likelihood that a subscriber station will receive service is reduced.

As the imbalance increases, the sector with the better forward link quality metric has a higher DRC erasure rate, due to worse reverse link quality metric. Consequently, the advantage of an AT pointing the AT's DRC to a sector with a better forward link quality metric is reduced because the DRC erasure rate at the sector with the better forward link quality metric may be so large as to reduce the forward link throughput significantly. In an extreme case, if the DRC erasure Rate is 100%, regardless of the forward link quality metric, the AT is not served. On the other hand, re-pointing the AT's DRC to a sector with a better reverse link quality metric may not improve the forward link throughput because the sector's forward link quality metric is reduced.

The above-described design of the DRC channel has margin of adjustment, via the DRC channel gain and DRC repetition, enabling mitigation of imbalance. Consequently, methods for adaptively changing the margin in the DRC channel in response to link imbalance changes may delay, and possibly avoid, level of imbalance affecting the rate of data throughput.

First Method

A value of at least one variable affecting the DRC channel margin is determined in accordance with conditions in the communication system. The at least one variable is then set to the determined value, thus adjusting the DRC channel margin. The conditions may comprise changes in an active set, and changes in a rise over thermal differential among sectors.

In one embodiment, a value of a variable DRC channel gain is set to a constant. The constant is determined by simulations, field-testing, and other known engineering methods. A value of a variable DRC message length is initially set to a default, which may be 2 for an access terminal not in handoff, and 4 otherwise. Subsequently, the value of the variable DRC message length is changed to a value determined in accordance with conditions in the communication system.

In another embodiment, a value of the variable DRC message length is set to a constant. The constant is determined by simulations, field-testing, and other known engineering methods. The value of the variable DRC channel gain is initially set to a default value, which may be −1.5 dB for an access terminal not in handoff, and −3 dB otherwise. Subsequently, the value of the variable DRC channel gain is changed to a value determined in accordance with conditions in the communication system.

In yet another embodiment, the values of the variable DRC channel gain and the variable DRC message length are initially set to a default value. Subsequently, the values of the variables DRC channel gain and the DRC message length are changed to values determined in accordance with conditions in the communication system.

As described, the active set size changes in accordance with changing conditions in the communication system, e.g., changes in reverse and forward links, movement of access terminals, and the like. Changes in the active set size may result in a change of a differential transmit power between sectors in the active set. The term "differential transmit power" is a difference in transmit power between two sectors. Since imbalance may arise when the active set size is greater than one, the only transmit power differentials that need to be considered are the transmit power differentials between cells in the active set.

A control entity determines the differential transmit power between sectors in the active set in accordance with the sectors' transmit power. The sectors may report the sectors' transmit power to the control entity. The control entity may comprise e.g., a controller 110 from FIG. 1 (BSC). The differential transmit power may be determined continuously or only upon change in active set size.

Additionally, even without an active set size change, the changing conditions in the communication system may result in change of a rise over thermal. The term "rise over thermal" is a difference between a noise floor and a total received power as measured by a sector. The measurement of noise by the sectors is well known. Such a measurement is disclosed in U.S. Pat. No. 6,192,249 entitled "Method and apparatus for reverse link loading estimation", assigned to the assignee of the present invention.

The control entity determines the differential rise over thermal between sectors in the active set in accordance with the sectors' noise. The sectors measure noise at periodic interval, e.g., a second, and report the measured noise upon measurement, to the control entity. Alternatively, the sectors measure noise at periodic interval, but report the measured noise only upon a change of the measured noise, in order to minimize traffic on the backhaul. The measured noise may be filtered before being reported to the control entity or by the control entity. The filter may be a first order filter with a time-constant of 300 slots.

When the control entity determines that either a differential rise over thermal between sectors in the active set exceeded a differential rise over thermal threshold or following a change in an active set size a differential transmit power between sectors in the active set exceeded a differential transmit power threshold, the control entity changes at least one variable affecting the DRC channel margin.

When the at least one variable affecting the DRC channel margin to be changed is a DRC message length, the value of the DRC message length is increased. The value of the DRC message length may be increased by 4.

When the at least one variable affecting the DRC channel margin to be changed is a DRC gain, the value of the DRC gain is increased. The value the DRC gain may be increased by 1.5 dB.

When the at least one variable affecting the DRC channel margin to be changed comprises both the DRC message length and the DRC gain, the control entity first tests whether one of the variables, e.g., the DRC gain, is at a maximum value. If the variable is not at the maximum value, the value of the variable is increased. If the variable is at the maximum value, the other variable, i.e., the DRC message length, is tested for a maximum value. If the other variable is not at the maximum value, the value of the other variable is increased; otherwise, no change to the other variable is made.

When the control entity fails to determine that either a differential rise over thermal between sectors in the active set exceeded the differential rise over thermal threshold or following a change in an active set size a differential transmit power between sectors in the active set exceeded the differential transmit power threshold, the control entity decreases the value at least one variable affecting DRC channel margin. The control entity may set the value at least one variable to a default.

Figure 3:
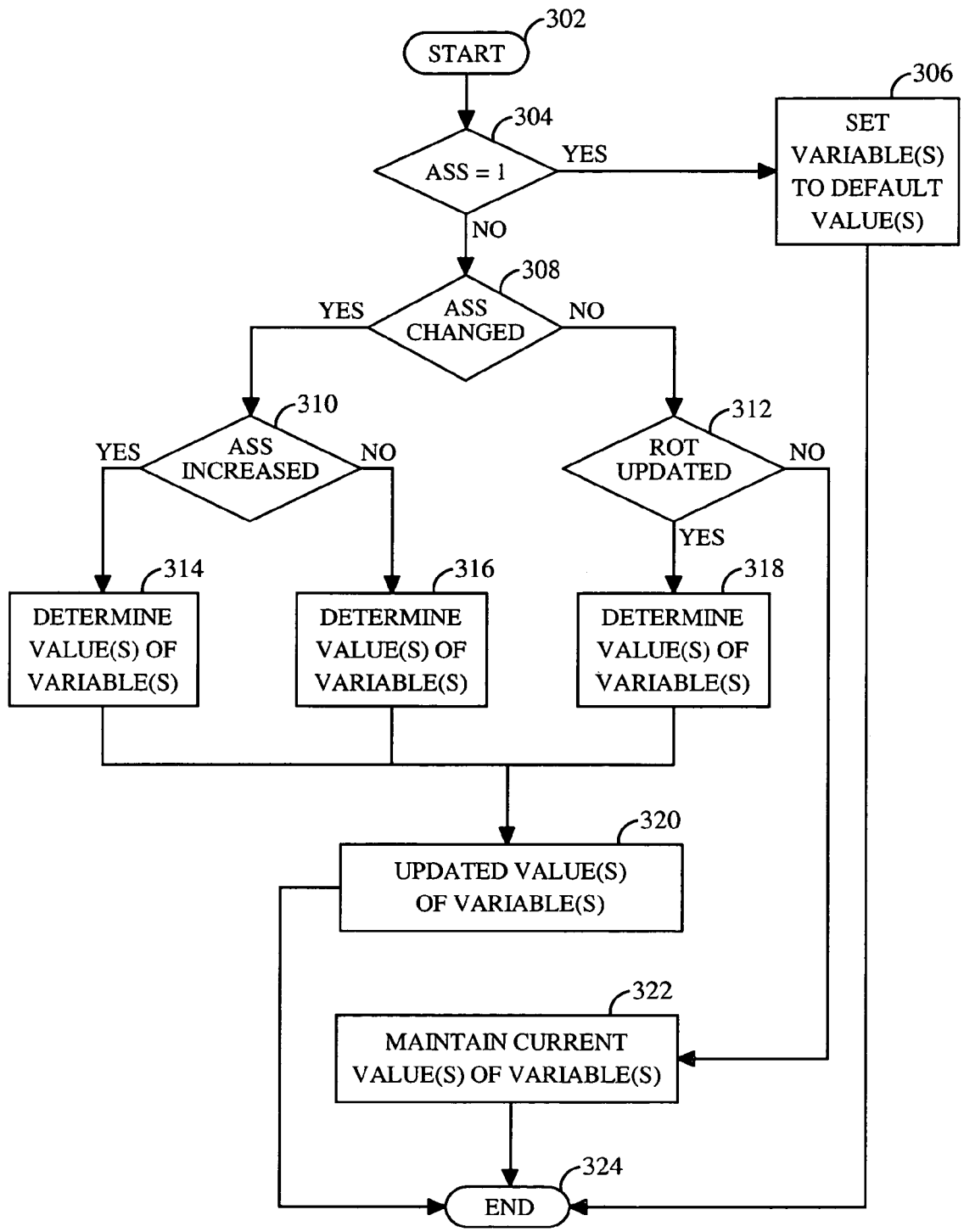
FIG. 3 illustrates an adjustment of a DRC Channel margin.

A flowchart illustrating the above-described concepts is presented in FIG. 3. The method starts in block 302, and continues in step 304.

In step 304, the active set size (ASS) is compared to 1. If the active set size is equal to 1, the method continues in step 306, otherwise, the method continues in step 308.

In step 306, the at least one variable is set to a default value, and the method continues in step 324.

In step 308, the active set size is tested for change. If the active set size has changed, the method continues in step 310, otherwise, the method continues in step 312.

In step 310, the active set size is tested for increase or decrease. If the active set size was increased, the method continues in step 314, otherwise, the method continues in step 316.

In step 314, the desired value of the at least one variable is determined. A differential transmit power between a newly added sector and each of the sectors in the active set is calculated. If any of the calculated differential transmit powers exceeds a first differential transmit power threshold, the value of the at least one variable is set as described above. The method continues in step 320.

In step 316, the desired value of the at least one variable is determined. If the decrease in the active set size resulted in active set size of one, the current value of the at least one variable is set to a default value. Otherwise, for each pair of the sectors in the active set, the differential transmit power is calculated. If any of the calculated differential transmit powers exceeds a second differential transmit power threshold, the value of the at least one variable is set as described above. The method continues in step 320.

In step 312, the test whether a rise over thermal has changed is performed. If the rise over thermal is unchanged, the method continues in step 322, otherwise the method continues in step 318.

In step 318, the desired value of the at least one variable is determined. For each pair of the sectors in the active set, the difference between the two sectors' rise over thermal is calculated. If any of the calculated differences exceeds a rise over thermal threshold, the value of the at least one variable is set as described above. The method continues in step 320.

In step 320, the value of the at least one variable is updated. The method continues in step 324.

In step 322, the value of the at least one variable is maintained.

In step 324, the method ends.

The above discussion assumes that a forward link transmit power is adjusted independently for each sector. However, it is possible that sectors of the same base station, transmitting to a subscriber station will transmit at the same power. In such a case, changing an active set size by adding a sector of a base station, whose another sector is already a member of the active set does not change differential transmit power. Similarly, changing an active set size by removing one of a plurality of sectors of a base station does not change differential transmit power. Therefore, the determination of a value of the at least one variable in accordance with an active set size change occurs only when the change in number of sectors is accompanied in change in number of base stations whose sectors are added or removed from the active set. It is further appreciated, that there is no need to determine a transmit power differential between sectors of the same cell.

Second Method

Alternatively, a value of at least one variable affecting the DRC channel margin is determined in accordance with conditions in the communication system. The at least one variable is then set to the determined value, thus adjusting the DRC channel margin. The conditions may comprise, e.g., forward link utilization (U), a DRC erasure rate (Re), and other conditions.

Sector Processing

In one embodiment, a value of a variable DRC channel gain is set to a constant. The constant is determined by simulations, field-testing, and other known engineering methods. A value of a variable DRC message length is initially set to a default, which may be 2 for an access terminal not in handoff, and 4 otherwise. Subsequently, the value of the variable DRC message length is changed to a value determined in accordance with conditions in the communication system.

In another embodiment, a value of the variable DRC message length is set to a constant. The constant is determined by simulations, field-testing, and other known engineering methods. The value of the variable DRC channel gain is initially set to a default value, which may be −1.5 dB for an access terminal not in handoff, and −3 dB otherwise. Subsequently, the value of the variable DRC channel gain is changed to a value determined in accordance with conditions in the communication system.

In yet another embodiment, values of the variable DRC channel gain and the variable DRC message length are initially set to default values. The DRC channel gain is initially set to a default value, which may be −1.5 dB when an access terminal is not in handoff, and −3 dB otherwise. The DRC message length is initially set to a default value, which may be 2 when an access terminal is not in handoff, and 4 otherwise. Subsequently, both the variables DRC channel gain and DRC message length are adjusted by a serving sector. The other sectors in the access terminal's active set adjust the DRC channel gain only.

Each sector determines forward link utilization and a DRC erasure rate of all access terminals whose active set contain the sector. The term "forward link utilization" is a value evaluated as one minus a percentage of slots on the forward link that are idle because all the DRC symbols from access terminals served by a sector are erased. The forward link utilization value may be filtered with a filter with a time constant. The time constant may comprise 2 minutes.

When a serving sector determines that the determined DRC erasure rate is above a second erasure rate threshold value (Te2) or that the forward link utilization (U) is below a first utilization threshold value (Tu1), the serving sector proceeds as follows.

When only one variable affecting the DRC channel margin is to be changed, the serving sector tests whether the variable, e.g., the DRC channel gain or the DRC message length, is at the maximum value. If the variable is at maximum value, the value of the variable is maintained. The determination to maintain the value of the variable is indicated by sending no adjustment message to the access terminal. Alternatively, an adjustment message indicating that a current value of the variable is to be kept ("hold") is sent. If the variable is not at the maximum value, the value of the variable is increased. The determination to increase the value of the variable is indicated by sending transmit an adjustment message indicating that the access terminal is to increase the at least one variable ("up").

When at least one variable affecting the DRC channel margin to be changed, the serving sector tests whether one of the at least one variable, e.g., the DRC channel gain, is at the maximum value. If the one variable is not at the maximum value, the value of the variable is increased. The determination to increase the value of the variable is indicated by sending transmit an adjustment message indicating that the access terminal is to increase the at least one variable ("up"). If the one variable is at the maximum value, the serving sector tests whether the other of the at least one variable, e.g., the DRC message length, is at the maximum value. If the other variable is at maximum value, the values of both variables are maintained. The determination to maintain the values of the variables is indicated by sending no adjustment message to the access terminal. Alternatively, an adjustment message indicating that current values of the variables are to be kept ("hold") is sent. If the other variable is not at the maximum value, the value of the other variable is increased and the value of the one variable is set to a default value. For example, the DRC message length is doubled and the DRC channel gain is set to the default value. The determination to adjust the values of the variables is indicated by sending transmit an adjustment message indicating that the access terminal is to perform the required adjustment.

The adjustment message indicating that the access terminal is to adjust the DRC channel gain may be a DRC Power Control (DPC) message. The DPC message symbols are exclusively OR'ed (XOR) with a unique Walsh code. This XOR operation is referred to as Walsh covering of a signal. The DPC message Walsh covered symbols are repeated 8 times. Therefore, a new DPC symbol will be sent every 32 frames. The DPC symbols values and interpretation are summarized in Table 1. In Table 1, the "+" means a first value, and the symbol "−" means a second value.

TABLE 1

| DRC Symbol | Interpretation |
|---|---|
| ++++++++ | Up |
| − − − − − − − − | Down |
| + − + − + − + − | Hold |

The adjustment message indicating that the access terminal is to adjust the DRC message length and the DRC channel gain may be a Traffic Channel Assignment message, transmitted on a forward link traffic channel.

However, it is appreciated that other messages and channels may be used.

It will be appreciated that the order of adjusting the DRC message length and the DRC channel gain is not important, the example of adjusting the DRC channel gain first in a way of example only.

When a serving sector determines that the determined DRC erasure rate is below a first erasure rate threshold value (Te1) and that the forward link utilization (U) is above a second utilization threshold value (Tu2), or, alternatively, that the determined DRC erasure rate is below a first erasure rate threshold value (Te1) or that the forward link utilization (U) is above a second utilization threshold value (Tu2), the serving sector proceeds as follows.

When only one variable affecting the DRC channel margin is to be changed, the serving sector tests whether the variable, e.g., the DRC channel gain or the DRC message length, is at a minimum value. If the variable is at the minimum value, the value of the variable is maintained. The determination to maintain the value of the variable is indicated by sending no adjustment message to the access terminal. Alternatively, an adjustment message indicating that a current value of the variable is to be kept ("hold") is sent. If the variable is not at the minimum value, the value of the variable is decreased. The determination to decrease the value of the variable is indicated by sending an adjustment message indicating that the access terminal is to decrease the at least one variable ("down").

When at least one variable affecting the DRC channel margin to be changed, the serving sector tests whether one of the at least one variable, e.g., the DRC channel gain, is at a minimum value. If the one variable is not at the minimum value, the value of the variable is decreased. The determination to decrease the value of the variable is indicated by sending transmit an adjustment message indicating that the access terminal is to decrease the at least one variable ("down"). If the one variable is at the minimum value, the serving sector tests whether the other of the at least one variable, e.g., the DRC message length, is at a minimum value. If the other variable is at a minimum value, the values of both variables are maintained. The determination to maintain the values of the variables is indicated by sending no adjustment message to the access terminal. Alternatively, an adjustment message indicating that current values of the variables are to be kept ("hold") is sent. If the other variable is not at the minimum value, the value of the other variable is decreased and the value of the one variable is set to a maximum value. For example, the DRC message length is reduced by one half and the DRC channel gain is set to a maximum value. The determination to adjust the values of the variables is indicated by sending an adjustment message indicating that the access terminal is to perform the required adjustment.

When a non-serving sector determines that the determined DRC erasure rate is above a second erasure rate threshold value (Te2), the non-serving sector proceeds as follows.

When only one variable affecting the DRC channel margin is to be changed, the serving sector, the value of the variable is increased. The determination to increase the value of the variable is indicated by sending an adjustment message indicating that the access terminal is to increase the at least one variable ("up").

When a non-serving sector determines that the determined DRC erasure rate is below a first erasure rate threshold value (Te1), the non-serving sector proceeds as follows.

When only one variable affecting the DRC channel margin is to be changed, the serving sector, the value of the variable is decreased. The determination to decrease the value of the variable is indicated by sending transmit an adjustment message indicating that the access terminal is to decrease the at least one variable ("down").

Figure 4:
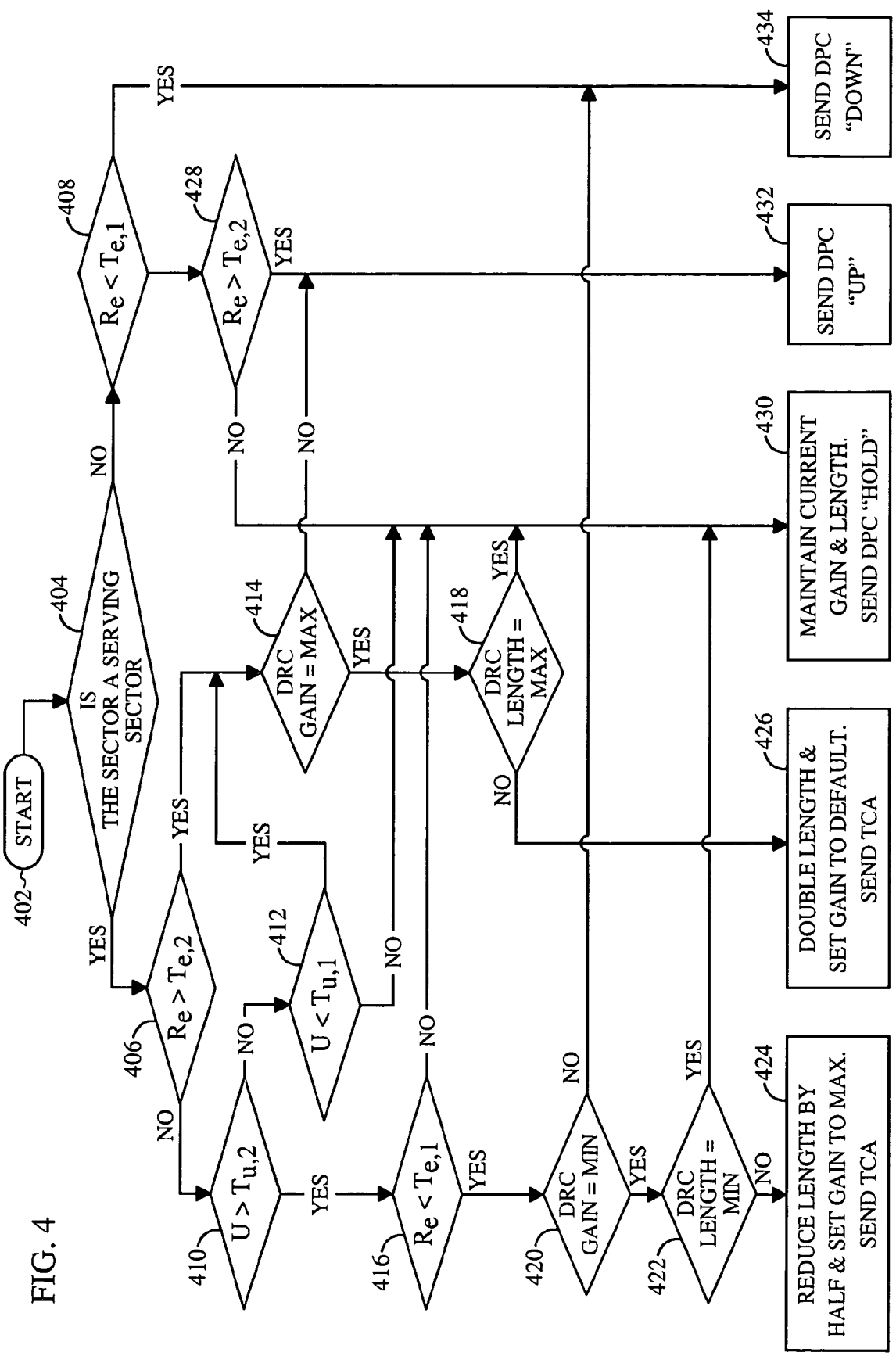
FIG. 4 illustrates sector processing for an adjustment of a DRC Channel margin.

A flowchart, illustrating sector processing in accordance with the above-described embodiment when at least two variables are adjusted is presented in FIG. 4 by the way of example. It is appreciated that the processing may be extended to one variable. The method starts in block 402, and continues in step 404.

In step 404, the determination whether a sector is a serving sector for the access terminal is made. If the sector is a serving sector, the method continues in step 406, otherwise, the method continues in step 408.

In step 406, the DRC erasure rate is compared against a second erasure rate threshold. If the DRC erasure rate is below the second erasure rate threshold, the method continues in step 410, otherwise, the method continues in step 414.

In step 414, the determination whether a DRC gain is maximum is made. If the DRC gain is maximum, the method continues in step 418, otherwise, the method continues in step 432.

In step 432, the sector sends an adjustment message (DPC) to increase the DRC gain ("up").

In step 418, the determination whether a DRC length is maximum is made. If the DRC length is maximum, the method continues in step 430, otherwise, the method continues in step 426.

In step 426, the sector sends an adjustment message (TCA) to double the DRC length and set the gain to default value.

In step 430, the sector sends an adjustment message (DPC) to maintain the current settings of the DRC length and the DRC gain.

In step 410, the forward link utilization is compared against a second utilization threshold. If the forward link utilization is below the second utilization threshold, the method continues in step 412, otherwise, the method continues in step 416.

In step 412, the forward link utilization is compared against a first utilization threshold. If the forward link utilization is below the first utilization threshold, the method continues in step 414, otherwise, the method continues in step 430.

In step 416, the DRC erasure rate is compared against a first erasure rate threshold. If the DRC erasure rate is below the first erasure rate threshold, then the method continues in step 420, otherwise, the method continues in step 430.

In step 420, the determination whether a DRC gain is minimum is made. If the DRC gain is minimum, the method continues in step 422, otherwise, the method continues in step 434.

In step 434, the sector sends an adjustment message (DPC) to decrease the DRC gain ("down").

In step 422, the determination whether a DRC length is minimum is made. If the DRC length is minimum, the method continues in step 430, otherwise, the method continues in step 424.

In step 424, the sector sends an adjustment message (TCA) to decrease the DRC length by 50% and set the gain to a maximum value.

In step 408, the DRC erasure rate is compared against a first erasure rate threshold. If the DRC erasure rate is below the first erasure rate threshold, the method continues in step 434, otherwise, the method continues in step 428.

In step 428, the DRC erasure rate is compared against a second erasure rate threshold. If the DRC erasure rate is below the second erasure rate threshold, the method continues in step 430, otherwise, the method continues in step 432.

Access Terminal DRC Gain Determination

As discussed, the serving sector needs to know the access terminal's DRC gain, so that the serving sector may properly generate an adjustment message. However, the serving sector has no knowledge of the access terminal's DRC gain, except immediately after the access terminal receives an adjustment message and responds with a message, e.g. a Traffic Channel Completion message. Therefore, the serving sector needs to estimate the DRC gain of the access terminal.

The serving sector may determine the DRC gain of an access terminal in accordance with a change of the DRC erasure rate in response to an adjustment message. When the DRC erasure rate does not decrease by more than a first amount, e.g., 10%, in response to the last adjustment message "up", the serving sector determines that the access terminal's DRC gain is at the maximum value. Similarly, when the DRC erasure rate does not increase by more than a second amount, e.g., 10%, in response to the serving sector's last adjustment message "down" while no other sectors' adjustment message "up," the serving sector determines that the access terminal's DRC gain is at the nominal value.

Alternatively, determine that the access terminal's DRC gain is at the maximum value when the serving sector sends a first pre-determined number of consecutive DPC "up". The first pre-determined number may be 2. Similarly, when the serving sector sends a second pre-determined number of consecutive DPC "down" while no other sector sends DPC "up", then the serving sector determines that the access terminal's DRC gain is at the nominal value. The second pre-determined number may be 2.

Access Terminal Processing

Upon receiving, at an access terminal, an adjustment message indicating adjustment of a DRC message length or a DRC channel gain or both, the DRC message length and the DRC channel gain, the access terminal ascertains, from which sector was the message transmitted.

When the access terminal determines that the message was transmitted by the serving sector, the access terminal carries out adjustment of the attributes of the DRC channel indicated by the message.

When the access terminal determines that the message was transmitted by a non-serving sector, the access terminal carries out the adjustment in accordance with design criteria of the communication system. Such a design criteria may comprise, e.g., carrying out adjustment of the attribute of the DRC channel indicated by a message transmitted by a non-serving sector with the best quality of forward link, as determined at the access terminal.

Figure 5:
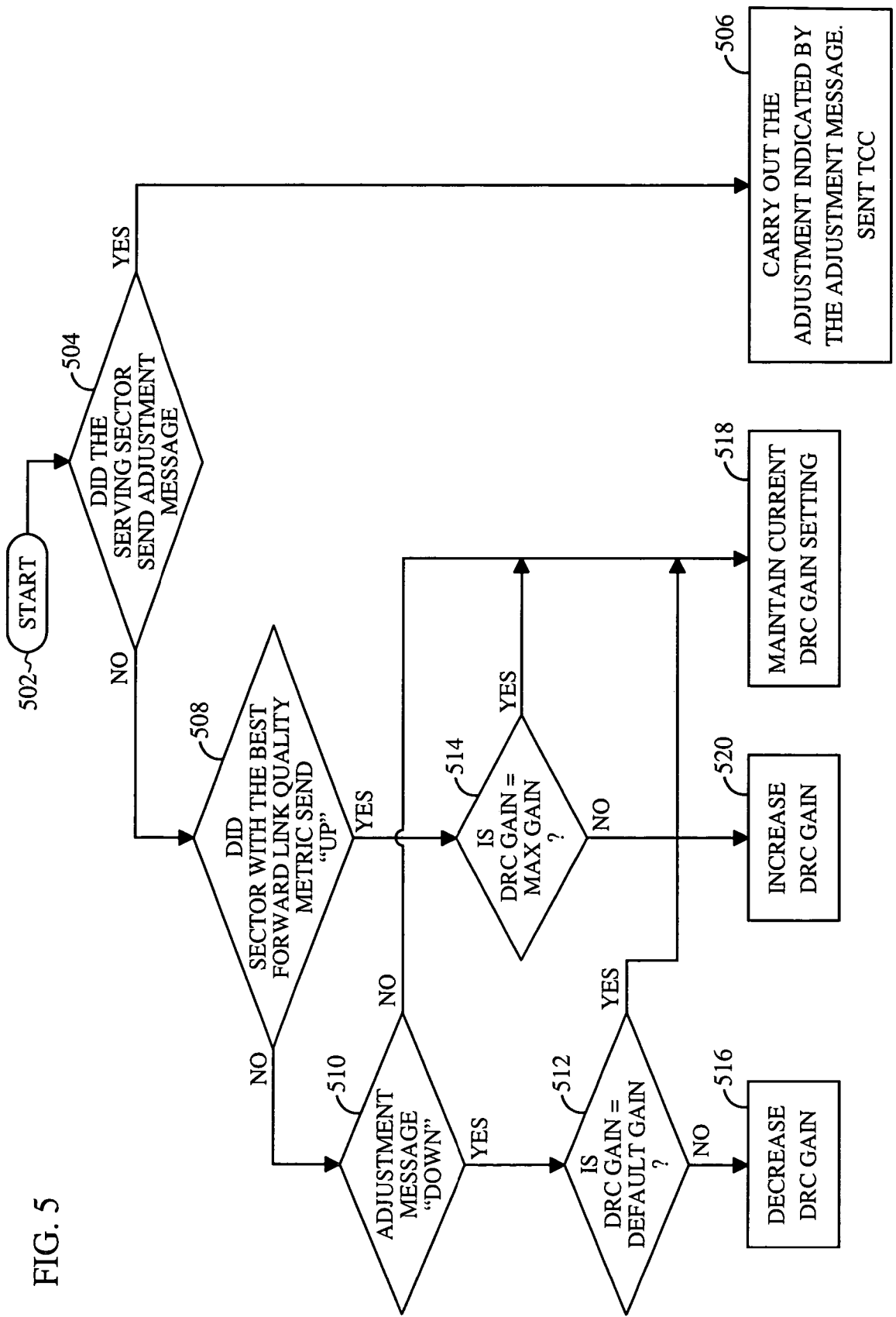
FIG. 5 illustrates access terminal processing for an adjustment of a DRC Channel margin.

A flowchart illustrating the above-described embodiment at an access terminal is presented in FIG. 5. The method starts in block 502, and continues in step 504.

In step 504, the access terminal ascertains, from which sector was a message indicating adjustment of a DRC message length or a DRC channel gain or the DRC message length and the DRC channel gain, transmitted. If the message was transmitted form a serving sector, the method continues in step 506, otherwise, the method continues in step 508.

In step 506, the access terminal carries out the adjustment indicated by the message.

In step 508, the access terminal ascertains, whether a non-serving sector that transmitted the message satisfies the design criteria of the communication system. If no non-serving sector that transmitted the message satisfies the design criteria, the method continues in step 514, otherwise, the method continues in step 510.

In step 510, the access terminal ascertains whether the adjustment is to decrease the DRC channel gain or the DRC message length. If the adjustment is to decrease the DRC channel gain or the DRC message length, the method continues in step 512, otherwise, the method continues in step 514.

In step 512, the access terminal determines whether the DRC channel gain or the DRC message length is at minimum value. If the DRC channel gain or the DRC message length is at minimum value, the method continues in step 518, otherwise, the method continues in step 516.

In step 516, the DRC channel gain or the DRC message length is decreased by a first value.

In step 518, the DRC channel gain or the DRC message length is kept unchanged.

In step 514, the access terminal determines whether the DRC channel gain or the DRC message length is at maximum value. If the DRC channel gain or the DRC message length is at maximum value, the method continues in step 518, otherwise, the method continues in step 520.

In step 520, the DRC channel gain or the DRC message length is increased by a first value.

Data Rate Control Channel

Figure 6:
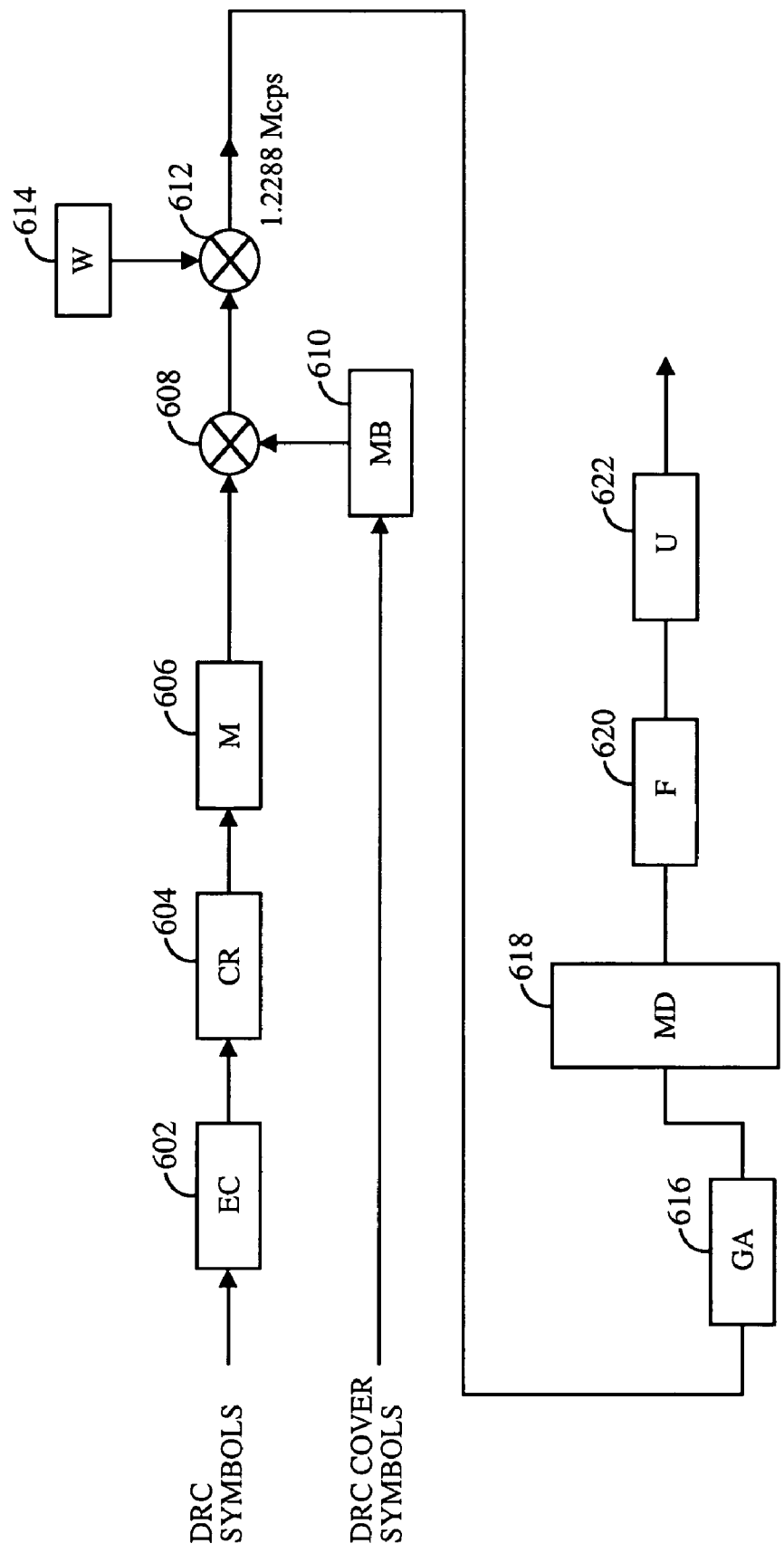
FIG. 6 illustrates a DRC Channel.

As discussed, a DRC channel is used by an access terminal to indicate to the access network the selected serving sector and the requested data rate on the forward traffic channel. FIG. 6 illustrates a conceptual diagram of a DRC channel 600.

The requested forward traffic channel data rate is mapped onto DRC symbol and provided to a block encoder 602. The symbol comprises number of bits allowing mapping of all traffic channel data rates. The block encoder 602 encodes the symbol yielding a code word, and provides the code word to a code word repetition block 604, which repeats the DRC code words. The DRC code words are then provided to a signal mapping block 606, which maps the DRC code word bit values, e.g. 0 and 1, onto signaling values, e.g., +1 and −1. The mapped DRC code words are then provided to a spreader block 608, which spreads each bit of the DRC code word by Walsh code $W_i$. The Walsh code $W_i$ is provided by a mapping block 610, which maps a DRC cover symbols representing DRC cover i, corresponding to the selected serving sector on the Walsh function $W_i$. Each chip of the spreaded DRC code word is further spread by a Walsh code W in a spreader block 616, and the spreaded DRC code word is provided to a gain adjustment block 616.

The gain adjustment block 616, adjusts the gain in accordance with the required DRC channel values as determined by the above-described methods.

The DRC channel signal is provided to a modulator block 618, which combines the DRC Channel signal with other incoming channel signals (not shown), and modulates the combined channel signals in accordance with an appropriate modulation method, e.g., a binary phase-shift keying (BPSK), a quadrature phase-shift keying (QPSK), quadrature amplitude modulation (QAM), 8-phase-shit keying (8-PSK), and other modulation methods known to one of ordinary skill in the art. The appropriate modulation method may change in accordance with a rate of data to be transmitted, channel condition, and/or other design parameter of the communication system. The combining of the incoming channel signals will change accordingly. For example, when a selected modulation method is QPSK, the incoming channel signals will be combined onto In-phase and Quadrature signals, and these signals will be quadrature spreaded. The selection of channel signals are combined on the In-phase and Quadrature signals in accordance with design parameter of the communication system, for example distributing the channels so that the data load between the In-phase and Quadrature signals is balanced.

The modulated signal is filtered in block 620, upconverted to a carrier frequency in block 622, and provided for transmission.

In the above-described DRC channel 600, the DRC value is transmitted repeated in a time slot in accordance with the setting of the code word repetition block 604, e.g., two times. This represents a DRC message length equal to one. When a message length is to be increased, the setting of the code word repetition block 604 is increased. Alternatively, the setting of the code word repetition block 604 may be held constant, and the DRC symbol corresponding to the requested forward traffic channel data rate are repeatedly provided as an input of the block encoder 602.

The above described functions of the DRC channel are controlled by a controller (not shown). Such a controller may comprise, e.g., a processor and a storage medium coupled to the processor and containing a set of instructions executable the processor.

One skilled in the art will appreciate that although the flowchart diagrams are drawn in sequential order for comprehension, certain steps can be carried out in parallel in an actual implementation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for determining values of variables for dynamic adjustment of a communication channel, the method comprising:
   determining a first metric of a first link;
   determining a second metric of a second link; and
   determining a value of at least one variable in accordance with the first metric and the second metric,
   wherein the determining a value of at least one variable in accordance with the first metric and the second metric comprises:
   if a sector served by a base station is a serving sector then:
      if the first metric is below a first threshold or the second metric is above a second threshold then:
         if a first variable is not at a first maximum value then:
            increasing the first variable,
   wherein if the first variable is at a first maximum value then:
      if a second variable of the at least one variable is not at a second maximum value then:
         increasing the second variable; and
         decreasing the first variable,
   wherein the increasing the second variable and decreasing the first variable comprises:
      doubling the value of the second variable; and
      setting the first variable to a default value.

2. The method as claimed in claim 1 wherein the determining a first metric of a first link comprises:
   determining a utilization of the first link.

3. The method as claimed in claim 1 wherein the determining a second metric of a second link comprises:
   determining an erasure rate of the second link.

4. The method as claimed in claim 1 wherein if a second variable of the at least one variable is at a second maximum value then:
   maintaining vales of the first variable and the second variable.

5. A method for determining values of variables for dynamic adjustment of a communication channel, the method comprising:
   determining a first metric of a first link;
   determining a second metric of a second link; and
   determining a value of at least one variable in accordance with the first metric and the second metric,
   wherein the determining a value of at least one variable in accordance with the first metric and the second metric comprises:
   if a sector served by a base station is a serving sector then:
      if the first metric is below a first threshold or the second metric is above a second threshold then:
         if the first variable is not at a first maximum value then:
            increasing the first variable,
   wherein if the first metric is above a third threshold or the second metric is below a fourth threshold then:
      if a first variable is not at a first minimum value then:
         decreasing the first variable.

6. The method as claimed in claim 5 wherein if the first metric is above a third threshold and the second metric is below a fourth threshold then:
   if a first variable is not at a first minimum value then:
      decreasing the first variable.

7. The method as claimed in claim 5 or 6 wherein if a first variable is at a first minimum value then:
   if a second variable is not at a second minimum value then:
      decreasing the second variable; and
      increasing the first variable.

8. The method as claimed in claim 7 wherein the decreasing the second variable and increasing the first variable comprises:
   reducing the value of the second variable by one half; and
   setting the value of the first variable to maximum value.

9. The method as claimed in claim 7 wherein if a second variable is at a second minimum value then:
   maintaining values of the first variable and the second variable.

10. A method for determining values of variables for dynamic adjustment of a communication channel, the method comprising:
    determining a first metric of a first link;
    determining a second metric of a second link; and
    determining a value of at least one variable in accordance with the first metric and the second metric,
    wherein the determining a value of at least one variable in accordance with the first metric and the second metric comprises:
    if a sector served by a base station is a serving sector then:
    if the first metric is below a first threshold or the second metric is above a second threshold then:
       if a first variable is not at a first maximum value then:
          increasing the first variable, wherein if the sector is a non-serving sector then:
    if the second metric is above a second threshold then:
       increasing the first variable.

11. The method as claimed in claim 10 wherein if the sector is a non-serving sector then:
    if the second metric is below a first threshold then:
       decreasing the first variable.

12. An apparatus for determining values of variables for dynamic adjustment of a communication channel, the apparatus comprising:
    a processor; and
    a storage medium coupled to the processor and containing a set of instructions executable
    the processor to.
    determine a first metric of a first link;

determine a second metric of a second link; and
determine a value of at least one variable in accordance with the first metric and the
second metric,
wherein the processor determines a value of at least one variable in accordance with the first metric and the second metric by executing a set of instructions to:
if a sector served by a base station is a serving sector then:
if the first metric is below a first threshold or the second metric is above a second threshold then:
if a first variable is not at a first maximum value then:
the processor executes a set of instructions to increase the first variable,
wherein if a first variable is at a first maximum value then;
if a second variable of the at least one variable is not at a second maximum value then:
the processor executes a set of instructions to:
increase the second variable; and
decrease the first variable,
wherein the processor increases the second variable and decreasing the first variable by executing a set of instructions to:
double the value of the second variable; and
set the first variable to a default value.

13. The apparatus as claimed in claim 12 wherein the processor determines a first metric of a first link by executing a set of instructions to:
determine a utilization of the first link.

14. The apparatus as claimed in claim 12 wherein the processor determines a second metric of a second link by executing a set of instructions to:
determine an erasure rate of the second link.

15. The apparatus as claimed in claim 12 wherein if a second variable of the at least one variable is at a second maximum value then:
the processor executes a set of instructions to maintain values of the first variable and the second variable.

16. An apparatus for determining values of variables for dynamic adjustment of a communication channel, the apparatus comprising:
a processor; and
a storage medium coupled to the processor and containing a set of instructions executable
the processor to.
determine a first metric of a first link;
determine a second metric of a second link; and
determine a value of at least one variable in accordance with the first metric and the
second metric,
wherein the processor determines a value of at least one variable in accordance with the first metric and the second metric by executing a set of instructions to:
if a sector served by a base station is a serving sector then:
if the first metric is below a first threshold or the second metric is above a second
threshold then:
if the first variable is not at a first maximum value then:
the processor executes a set of instructions to increase the first variable,
wherein if the first metric is above a third threshold or the second metric is below a fourth threshold then:
if a first variable is not at a first minimum value then:
the processor executes a set of instructions to decrease the first variable.

17. The apparatus as claimed in claim 16 wherein if the first metric is above a third threshold and the second metric is below a fourth threshold then:
if a first variable is not at a first minimum value then:
the processor executes a set of instructions to decrease the first variable.

18. The apparatus as claimed in claim 16 or 17 wherein if a first variable is at a first minimum value then:
if a second variable is not at a second minimum value then:
the processor executes a set of instructions to:
decrease the second variable; and
increase the first variable.

19. The apparatus as claimed in claim 18 wherein the processor decreases the second variable and increasing the first variable by executing a set of instructions to:
reduce the value of the second variable by one half; and
set the value of the first variable to maximum value.

20. The apparatus as claimed in claim 18 wherein if a second variable is at a second minimum value then:
the processor executes a set of instructions to maintain vales of the first variable and the
second variable.

21. An apparatus for determining values of variables for dynamic adjustment of a communication channel, the apparatus comprising:
a processor; and
a storage medium coupled to the processor and containing a set of instructions executable
the processor to.
determine a first metric of a first link;
determine a second metric of a second link; and
determine a value of at least one variable in accordance with the first metric and the
second metric,
wherein the processor determines a value of at least one variable in accordance with the first metric and the second metric by executing a set of instructions to:
if a sector served by a base station is a serving sector then:
if the first metric is below a first threshold or the second metric is above a second
threshold then:
if a first variable is not at a first maximum value then:
the processor executes a set of instructions to increase the first variable,
wherein if the sector is a non-serving sector then:
if the second metric is above a second threshold then:
the processor executes a set of instructions to increase the first variable.

22. The apparatus as claimed in claim 21 wherein if the sector is a non-serving sector then:
if the second metric is below a first threshold then:
the processor executes a set of instructions to decrease the first variable.

* * * * *